United States Patent [19]
Takabatake

[11] Patent Number: 6,134,982
[45] Date of Patent: Oct. 24, 2000

[54] SHOCK ABSORBING STEERING DEVICE

[75] Inventor: Yoshikazu Takabatake, Kyoto, Japan

[73] Assignee: Koyo Seiko Co., Ltd., Osaka, Japan

[21] Appl. No.: 09/038,995

[22] Filed: Mar. 12, 1998

[30] Foreign Application Priority Data

Mar. 14, 1997 [JP] Japan ................................ 9-081947

[51] Int. Cl.⁷ .................................................. B62D 1/19
[52] U.S. Cl. ............................................. 74/493; 280/777
[58] Field of Search ............................. 280/777; 74/493, 74/492; 464/162; 70/252, 186

[56] References Cited

U.S. PATENT DOCUMENTS

| | | | |
|---|---|---|---|
| 2,036,776 | 4/1936 | Rubner | 70/252 |
| 3,757,601 | 9/1973 | Burke | 74/492 |
| 4,452,096 | 6/1984 | Workman | 74/492 |
| 5,082,311 | 1/1992 | Melotik | 280/777 |
| 5,115,691 | 5/1992 | Beauch | 74/493 |
| 5,211,042 | 5/1993 | Watanuki | 70/252 |
| 5,470,107 | 11/1995 | Muntener et al. | 280/777 |
| 5,775,172 | 7/1998 | Fevre et al. | 74/492 |
| 5,944,348 | 8/1999 | Boyle, III et al. | 74/492 |

FOREIGN PATENT DOCUMENTS

| | | |
|---|---|---|
| 0 755 844 | 1/1997 | European Pat. Off. . |
| 7-17411 | 1/1995 | Japan . |
| 8-150944 | 6/1996 | Japan . |

*Primary Examiner*—David A. Bucci
*Assistant Examiner*—William C Joyce
*Attorney, Agent, or Firm*—Jacobson, Price, Holman & Stern, PLLC

[57] ABSTRACT

This is a shock absorbing steering device that provides the benefit of stable shock absorption in the event of a vehicle collision. A pair of connecting members connected through guide sections to a column that supports a steering shaft is connected to a vehicle member. This column is relatively movable in its axial direction with respect to the connecting members when force above a given level acts on the column along the axial direction. This column is arranged between the two connecting members.

4 Claims, 6 Drawing Sheets

SHOCK ABSORBING STEERING DEVICE

FIELD OF THE INVENTION

The present invention relates to a shock absorbing steering device used to absorb shock that would act on the driver in the event of a vehicle collision.

DESCRIPTION OF THE RELATED ART

For example, in the shock absorbing steering device that is disclosed in Early Japanese Patent Publication No. H8-150944 and No. H7-17411, there are provided a column that supports a steering shaft, and a pair of connecting members connected through a guide section to this column. Each connecting member is connected to the vehicle body. This column is made relatively movable along its axial direction with respect to the connecting members, when force above a given amount acts on the column along the axial direction. If therefore shock acts in the axial direction of the column due to a collision, the shock that would act on the driver is absorbed by the relative movement of this column with respect to the connecting members.

In a conventional shock absorbing steering device as described above, the column is positioned away from the space between the two connecting members in the radial direction of the column, so there is a dead space between the two connecting members. This creates the problem that the layout of other equipments is restricted in a vehicle interior where space is limited.

Also, in the above conventional shock absorbing steering device, it is difficult to transmit the force acting on the column in the event of a collision to both connecting members uniformly, so smooth relative movement of the column with respect to the two connecting members is obstructed.

Also, it is desired that a housing of a locking member, that is capable of locking rotation of the steering shaft to prevent theft, is provided on this column. In the prior art arrangement, when the column is relatively moved with respect to the connecting members, interference between this housing and the connecting members should be prevented. Accordingly, it is necessary to make the distance between this housing and the connecting members large. However, in a vehicle interior in which space is limited, it is difficult to make the distance between the housing and the connecting members large.

An object of the present invention is to provide a shock absorbing steering device that is capable of solving the above technical problems.

SUMMARY OF THE INVENTION

The shock absorbing steering device of the present invention comprises a column that supports a steering shaft, a pair of connecting members connected to this column through a guide section, the connecting members being connected to a vehicle body member, and the column being relatively movable along its axial direction with respect to the connecting members, when force above a given amount acts on the column along the axial direction, wherein the column is arranged between the two connecting members.

According to the constitution of the present invention, the space between the two connecting members can be effectively utilized because the column is arranged between the two connecting members. By this arrangement, restriction of the layout of other equipments within the vehicle body can be avoided.

In the present invention, it is preferable that the two connecting members are arranged on a line perpendicular to the axis of the column and that the distance from this axis to one connecting member and the distance from this axis to the other connecting member are equal.

In this way, the force acting on the column in the event of a collision can be uniformly transmitted to both connecting members, so that the column can be relatively moved in a smooth manner with respect to the two connecting members.

In the present invention, it is preferable that the connecting members are connected to a vehicle body member through a support member that radially extends in one direction from the outer periphery of the column, and a housing of a locking member that is capable of locking rotation of the steering shaft is provided so as to radially extend in the other direction from the outer circumference of the column.

In this way, when the column is moved relatively with respect to the connecting members, there is no possibility of the housing of the locking member interfering with the connecting members, so there is no need to make the distance between the housing and the connecting members large.

According to the present invention, a shock absorbing steering device can be provided, showing the benefit of shock absorption in stable manner in the event of a vehicle collision and suited to arrangement within a vehicle body in which space is limited.

DESCRIPTION OF THE PREFERRED EMBODIMENTS

An embodiment of the present invention is described below with reference to the drawings.

Figure 3:
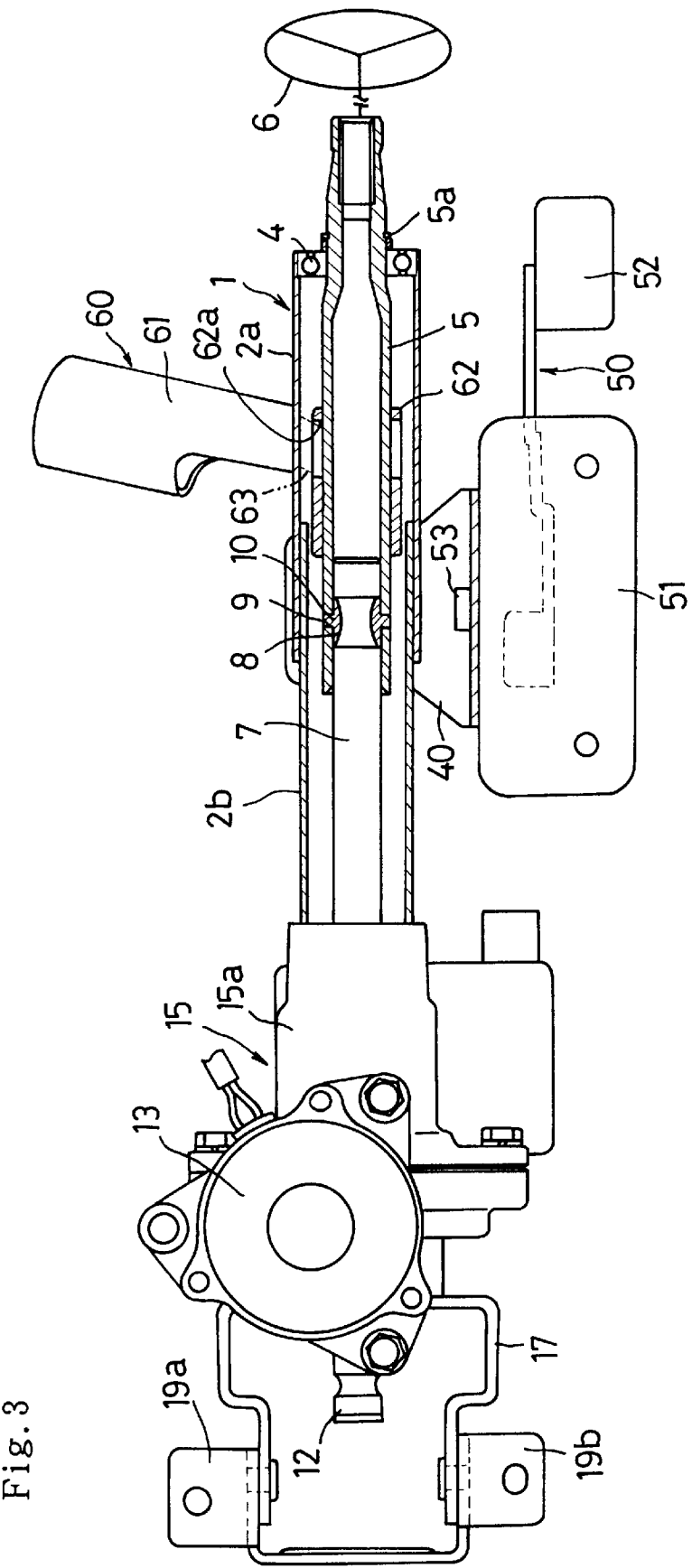
FIG. 3 is a partially broken away plan view of the shock absorbing steering device according to the embodiment of the present invention.
Figure 4:
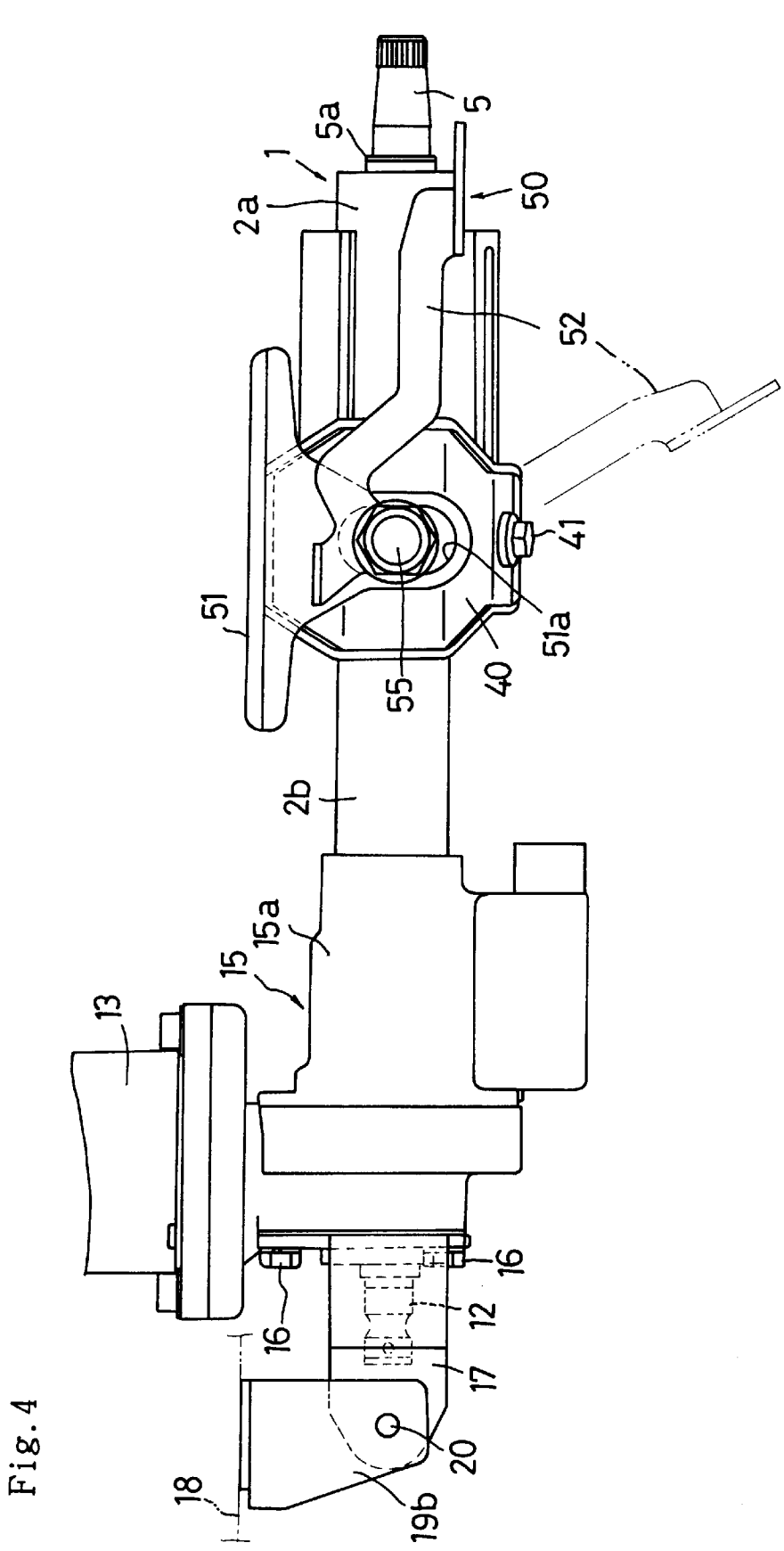
FIG. 4 is a side view of the shock absorbing steering device according to the embodiment of the present invention.
Figure 5:
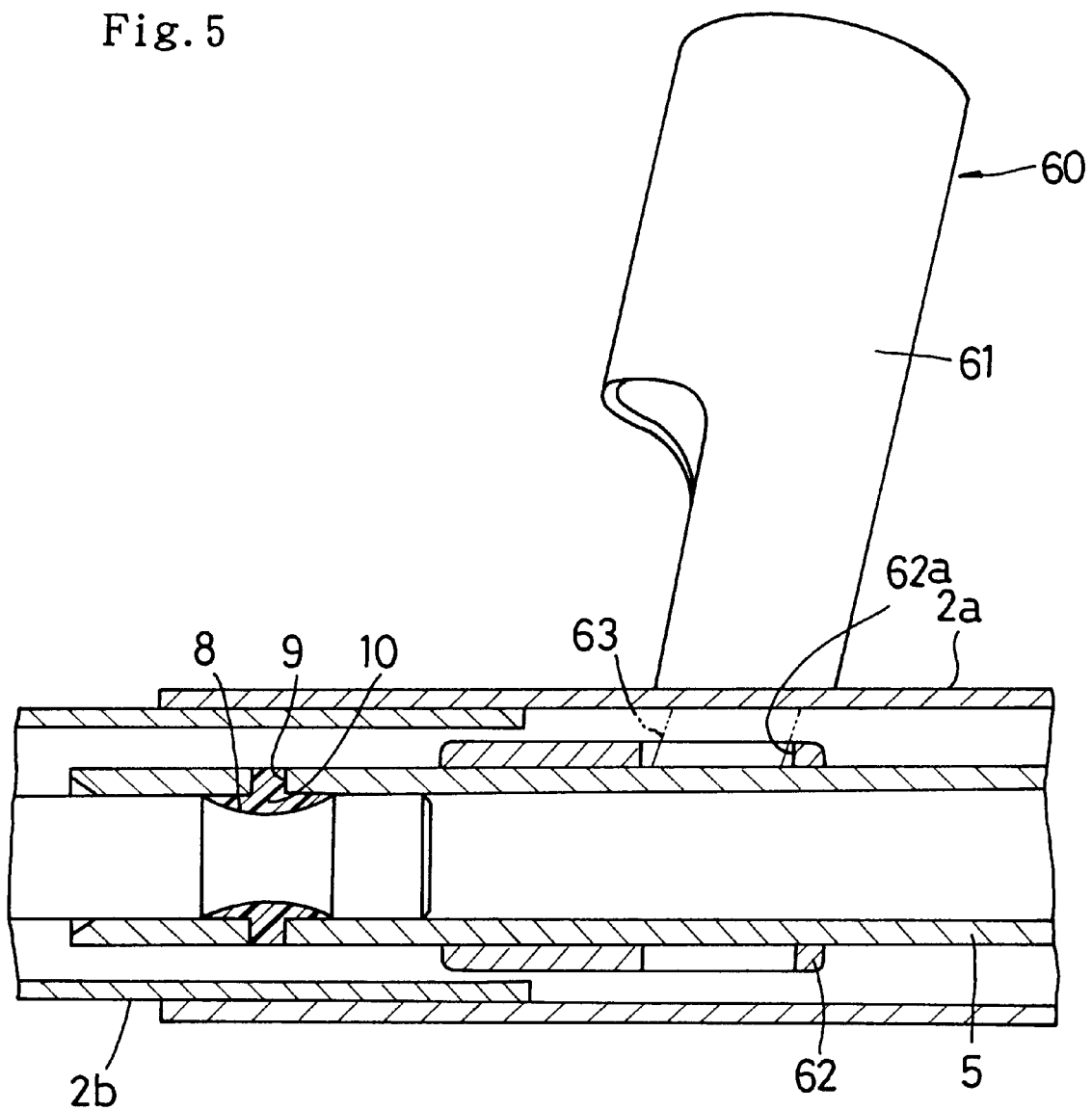
FIG. 5 is a partially sectioned view of the shock absorbing steering device according to the embodiment of the present invention.

A shock absorbing power steering device 1 shown in FIGS. 3, 4 and 5 comprises a cylindrical first column 2a and a cylindrical second column 2b. One end of the second column 2b is pressed into the first column 2a. By this arrangement, if a force above a given amount exceeding this pressing-in force acts on the first column 2a along the axial direction of the column 2a in the event of a vehicle collision, this first column 2a can be relatively moved in its axial direction with respect to the second column 2b.

The first column 2a supports a tubular first steering shaft 5 through a bearing 4. A steering wheel 6 is connected to one end of the first steering shaft 5. One end of the second steering shaft 7 is inserted into the other end of the first steering shaft 5 so that rotation can be transmitted between these shafts 5, 7. For example, by making the inner circumference of the first steering shaft 5 and the outer circumference of the second steering shaft 7 non-circular, rotation can be transmitted from the first steering shaft 5 to the second steering shaft 7.

The outer race of the bearing 4 engages with a step on the inner circumference of the first column 2a, and the inner race engages with a stop ring 5a mounted on the outer circumference of the first steering shaft 5. Thus, in the event of the vehicle collision, force can be transmitted from the steering wheel 6 through the first steering shaft 5 and bearing 4 to the first column 2a along the axial direction of the column 2a. A circumferential groove 8 is formed in the outer circumference of the second steering shaft 7. A through-hole 9 communicating with the circumferential groove 8 is formed in the first steering shaft 5. The through-hole 9 and circumferential groove 8 are filled with resin 10. By this arrangement, in the event of the vehicle collision, if force more than a given amount acts on the first steering shaft 5 along the axial direction of the shaft 5, the resin 10 is sheared. By the breakage of the resin 10, the first steering shaft 5 can be relatively movable along its axial direction with respect to the second steering shaft 7.

The other end of the second column 2b is integrated with a sensor housing 15a of a torque sensor 15 for detection of steering torque. Rotation of the second steering shaft 7 is transmitted to a third steering shaft 12 through the torque sensor 15. The rotation of the third steering shaft 12 is transmitted to the vehicle wheels through for example a known steering gear of rack and pinion type or ball screw type. By a steering assistance motor 13 mounted on the sensor housing 15a, steering assistance force corresponding to the steering torque detected by the torque sensor 15 is provided. Known devices can be employed as the torque sensor 15 and the steering assistance mechanism.

A support frame 17 mounted on the sensor housing 15a by means of bolts 16 is supported by means of a pair of lower support brackets 19a, 19b so as to be capable of tilting about a tilting shaft 20 that is arranged along the left/right direction of the vehicle body. The brackets 19a, 19b are mounted by means of bolts (not shown in the drawings) on the vehicle body member 18.

Figure 1:
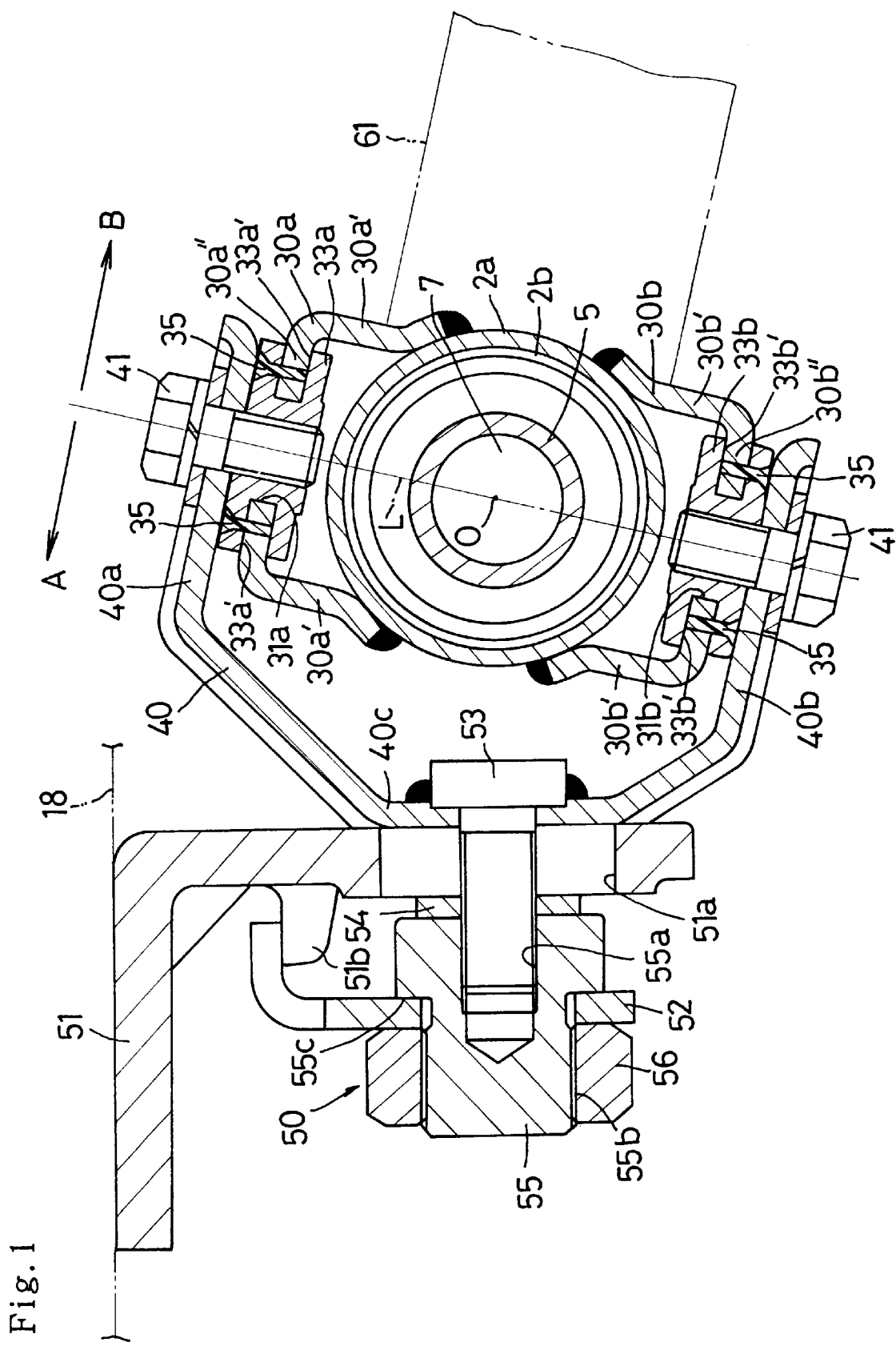
FIG. 1 is a cross-sectional view of major parts of a shock absorbing steering device according to an embodiment of the present invention.
Figure 2:
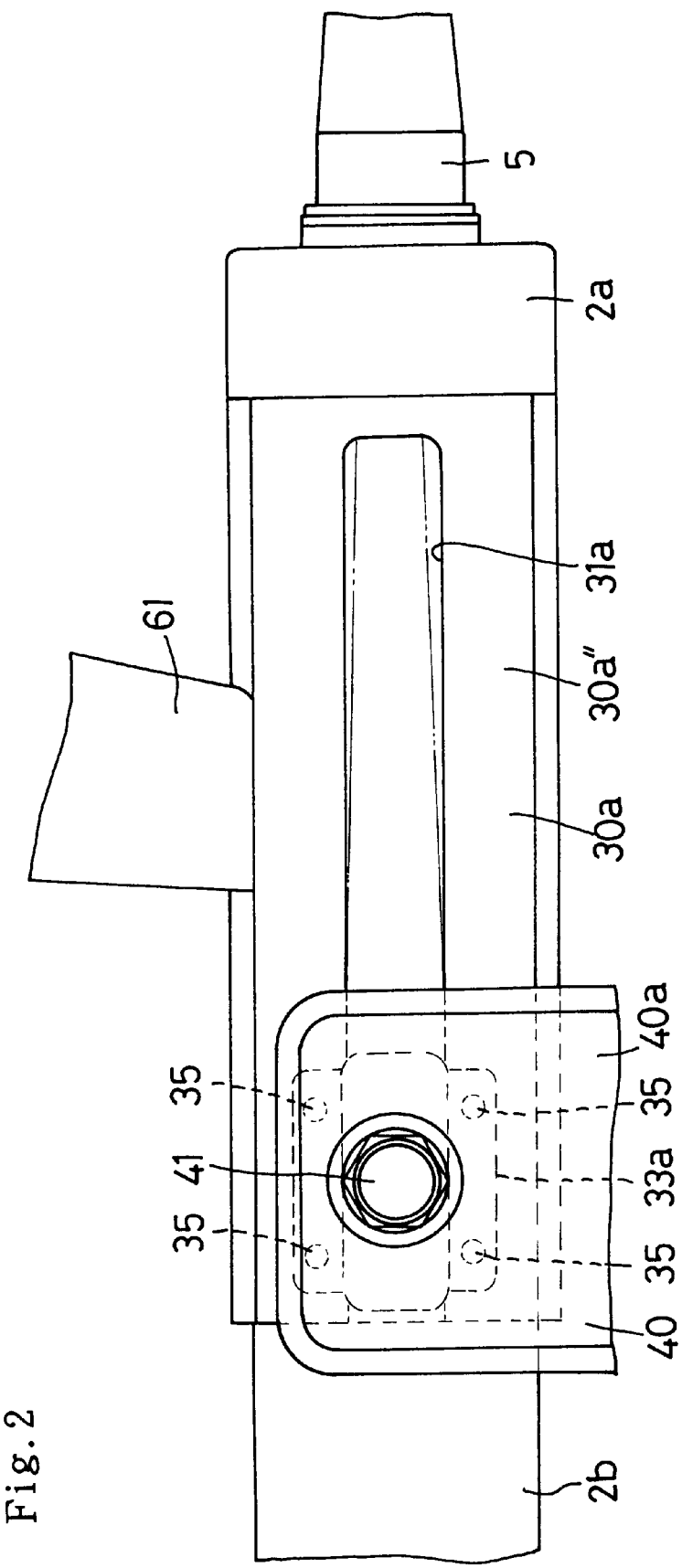
FIG. 2 is a plan view of major parts of the shock absorbing steering device according to the embodiment of the present invention.

As shown in FIG. 1 and FIG. 2, a pair of guide members 30a, 30b are united by welding with the circumference of the first column 2a. Each of the guide members 30a, 30b has a pair of feet 30a', 30b' and a guide section 30a'', 30b''. The feet 30a', 30b' project to the outside from the outer circumference of the first column 2a. Each of the guide sections 30a'', 30b'' is integrated with the feet 30a' or 30b' at the position separated from the outer circumference of the first column 2a. Each of the guide sections 30a'', 30b'' has a guide groove 31a or 31b running along the axial direction of the first column 2a. Each of the guide grooves 31a, 31b is closed at one end adjacent to the steering wheel, and is open at the other end adjacent to the vehicle wheel.

A pair of connecting members 33a, 33b are connected to the first column 2a through the guide sections 30a'', 30b''. Specifically, a pair of recesses 33a', 33b' are formed on each of the connecting members 33a, 33b along the axial direction of the first column 2a. Each of the guide sections 30a'', 30b'' is pressed into the recesses 33a' or 33b' along the axial direction of the first column 2a. Plural through-holes are formed in each of the guide sections 30a'', 30b''. Other through-holes communicating with the through-holes are formed in each of the connecting members 33a, 33b, and these through-holes are filled with resin 35. By this arrangement, the resin 35 is sheared, when force above a given amount exceeding the force for pressing the guide sections 30a'', 30b'' into the recesses 33a', 33b' acts on the first column 2a along the axial direction, with the result that the first column 2a is relatively movable along its axial direction with respect to the connecting members 33a, 33b.

As shown in FIG. 1, the first column 2a is arranged between the two connecting members 33a, 33b. These connecting members 33a, 33b are arranged on a line L perpendicular to the axis O of the first column 2a. The distance from this axis O to one connecting member 33a is equal to the distance from this axis O to the other connecting member 33b.

The connecting members 33a, 33b are connected to a vehicle body member 18 through a support member 40 that radially extends in one direction (direction indicated by the arrow A in FIG. 1) from the outer periphery of the first column 2a. In more detail, this support member 40 comprises a first support section 40a connected to one connecting member 33a, a second support section 40b connected to the other connecting member 33b, and a joining section 40c that joins both support sections 40a, 40b. Each of the connecting members 33a, 33b is connected to the support member 40 by means of bolts 41.

The support member 40 is connected to the vehicle body member 18 through a tilting angle adjustment mechanism 50. Specifically, as shown in FIG. 1, FIG. 3 and FIG. 4, this tilting angle adjustment mechanism 50 comprises an operating lever 52 and an upper support bracket 51 connected to the vehicle body member 18 by means of bolts (not shown in the drawings). A support bolt 53 inserted into the support member 40 is inserted into a slot 51a formed in the upper support bracket 51. The head of the support bolt 53 is welded to the support member 40. A female thread 55a formed on a lever hub 55 is screwed on to the support bolt 53. The operating lever 52, that is fitted to the outer circumference of the hub 55 so as to rotate together with the hub 55, is clamped by a nut 56 screwed on to a male thread 55b formed on the outer circumference of the hub 55 and a step 55c formed on the outer circumference of the hub 55. When the operating lever 52 is tilted to the position shown by the double-dotted chain line in FIG. 4, the screw-threaded relationship of the support bolt 53 and hub 55 is slackened. Movement of the support bolt 53 within the slot 51a along an arc centered on the tilting shaft 20 is thereby permitted. The tilting angle of the steering wheel 6 can be adjusted by means of this movement. When the operating lever 52 is tilted to its original position, the hub 55 that is screwed on to the support bolt 53 is pushed on to the upper support bracket 51 through a washer 54, and the support bolt 53 is thereby fixed. A stopper 51b for the operating lever 52 is formed on the upper support bracket 51 in order to prevent the support bolt 53 being screwed in excessively.

As shown in FIG. 3, a housing 61 of a locking device 60 is provided on the outer circumference of the first column 2a. A locking member 63 is housed in the housing 61. The housing 61 radially extends in the other direction (direction indicated by the arrow B in FIG. 1) from the outer circumference of the first column 2a. The locking member 63 projects from the housing 61 on lock operation by means of a key (not shown in the drawings), and is retracted into the housing 61 on unlocking operation. A known locking mechanism can be employed to move the locking member 63 in response to the key operation. Rotation of the first steering shaft 5 is locked when the locking member 63 projecting from the housing 61 is inserted into a recess 62a formed on a tubular member 62 that is fixed to the outer circumference of the first steering shaft 5. If torque is generated to rotate the steering wheel 6 in a condition wherein rotation of the first steering shaft 5 is locked by means of the locking member 63, the torque is received by the vehicle body member 18 through the guide members 30a, 30b.

Figure 6:
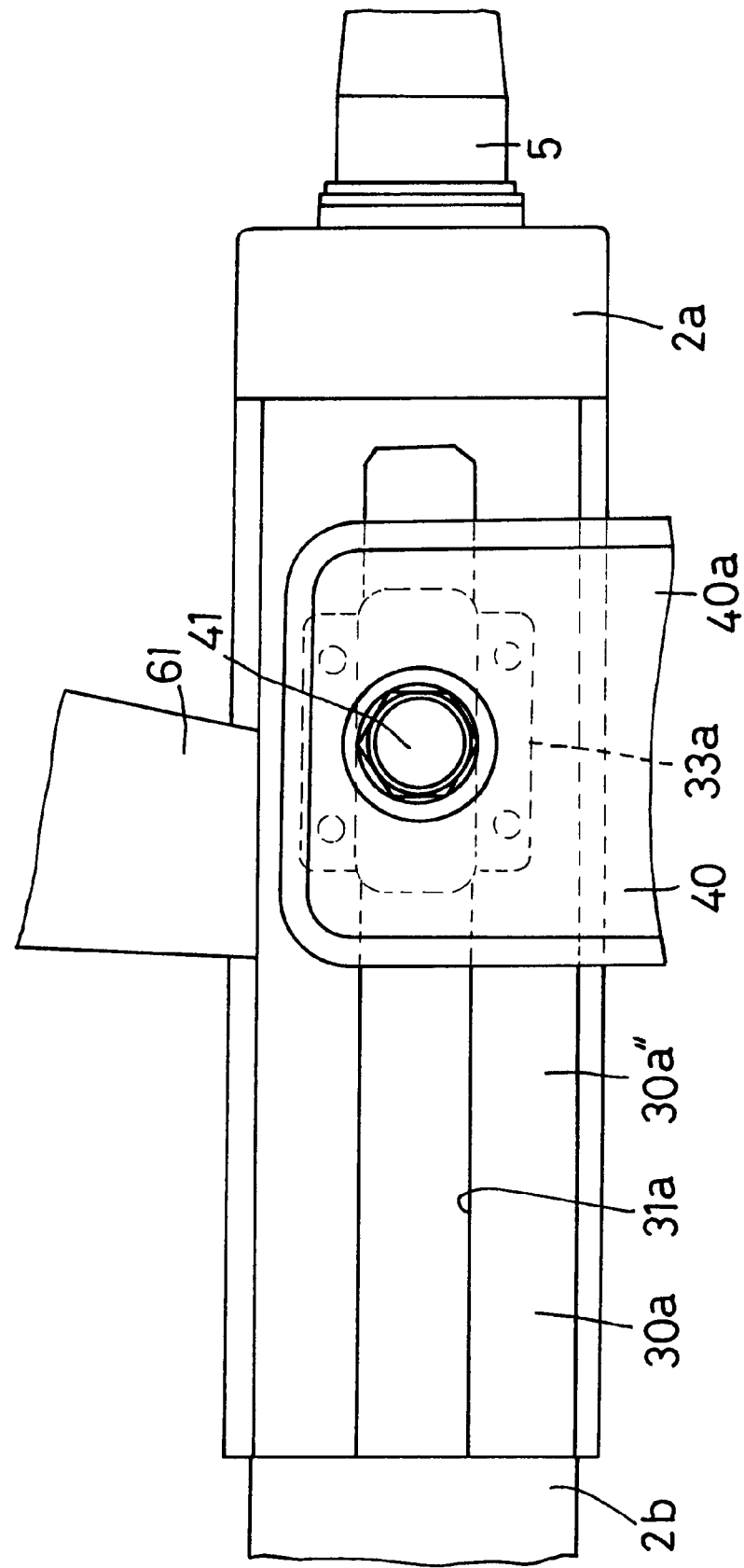
FIG. 6 is a view for explanation of the action of the shock absorbing steering device according to the embodiment of the present invention.

According to the constitution described above, by a collision between the vehicle and an obstacle existing in front of the vehicle, the resin 10 that connects the first steering shaft 5 to the second steering shaft 7 is sheared, the resin 35 that connects the connecting members 33a, 33b to the guide sections 30a", 30b" is sheared, and the connecting members 33a, 33b are moved relatively to the guide sections 30a", 30b", thereby, as shown in FIG. 6, the first column 2a moves in its axial direction relative to the connecting members 33a, 33b and the second column 2b. Impact energy can be absorbed by the shearing of the resin and by the friction between the relatively moving members. During the relative movement, the guide sections 30a", 30b" and connecting members 33a, 33b are maintained in engaged condition, and the position of their engagement is varied as the first column 2a moves relatively with respect to the connecting member 33a, 33b and second column 2b. The absorption characteristic of the impact energy is therefore stable since there is no possibility of the first column 2a becoming detached from the vehicle body member 18.

According to the above constitution, because the first column 2a is arranged between the two connecting members 33a, 33b, the space between the two connecting members 33a, 33b can be effectively utilized. By this arrangement, restriction of the layout of other equipments within the vehicle body can be avoided. Also, the two connecting members 33a and 33b are arranged on a line L perpendicular to the axis O of the first column 2a, and the distance from the axis O to one connecting member 33a and the distance from the axis O to the other connecting member 33b are made equal, thereby the force acting on the first column 2a in the event of a collision is uniformly transmitted to both connecting members 33a, 33b. Therefore, the first column 2a can be relatively moved in a smooth manner with respect to the two connecting members 33a, 33b, so the impact energy absorption characteristic is stabilized. There is no possibility of the housing 61 of the locking member 63 interfering with the connecting members 33a, 33b when the first column 2a is moved relatively with respect to the connecting members 33a, 33b, so there is no need to make the distance between the housing 61 and the connecting members 33a, 33b large. This device 1 can therefore be made of small size.

It should be noted that the present invention is not restricted to the embodiments described above. For example, the impact absorption effect can be adjusted by gradually varying the width of the guide grooves 31a, 31b along the axial direction of the first column 2a as shown by the double-dotted chain line in FIG. 2, or by gradually varying the thickness of the guide sections 30a", 30b" along the axial direction of the first column 2a. Also, the tilting angle adjustment mechanism can be dispensed with so that the support member 40 is directly connected to the vehicle body member 18.

What is claimed is:

1. A shock absorbing steering device comprising:
   a) a column that supports a steering shaft and a steering wheel, the column having an axis and an outer circumference;
   b) a pair of guide members having:
      1) respective guide sections; and
      2) respective pairs of feet that project outward from the outer circumference of the column;
   c) a support member adapted to be connected to a vehicle body member through a tilt adjustment mechanism for adjusting a tilting angle of the steering wheel; and
   d) a pair of connecting members that are connected to the support member and between which said column is arranged, each of the connecting members having a pair of recesses;
   wherein:
      1) each of the guide sections is pressed into the recesses along an axial direction of the column so that impact energy is absorbed by friction between the guide sections and the connecting members; and
      2) said column is relatively movable along its axial direction with respect to said connecting members, when force more than a predetermined amount acts on the column along the axial direction, a direction of said force along the axis of the column relative to said guide members remaining constant regardless of change of the tilting angle.

2. The shock absorbing steering device according to claim 1, wherein:
   said pair of connecting members are arranged on a line perpendicular to the axis of said column; and
   a distance from the axis of said column to one connecting member in said pair and a distance from the axis to the other connecting member in said pair are equal.

3. The shock absorbing steering device according to claim 1, wherein:
   said support member radially extends in a first direction from the outer circumference of said column; and
   a housing of a locking member that is capable of locking rotation of the steering shaft is arranged so as to radially extend from the outer circumference of said column in a second direction that is different from the first direction.

4. The shock absorbing steering device according to claim 2, wherein:
   said support member radially extends in a first direction from the outer circumference of said column; and
   a housing of a locking member that is capable of locking rotation of the steering shaft is arranged so as to radially extend from the outer circumference of said column in a second direction that is different from the first direction.

* * * * *